L. F. STAFFORD.
BUMPER FOR VEHICLES.
APPLICATION FILED OCT. 27, 1919.
1,348,329.
Patented Aug. 3, 1920.
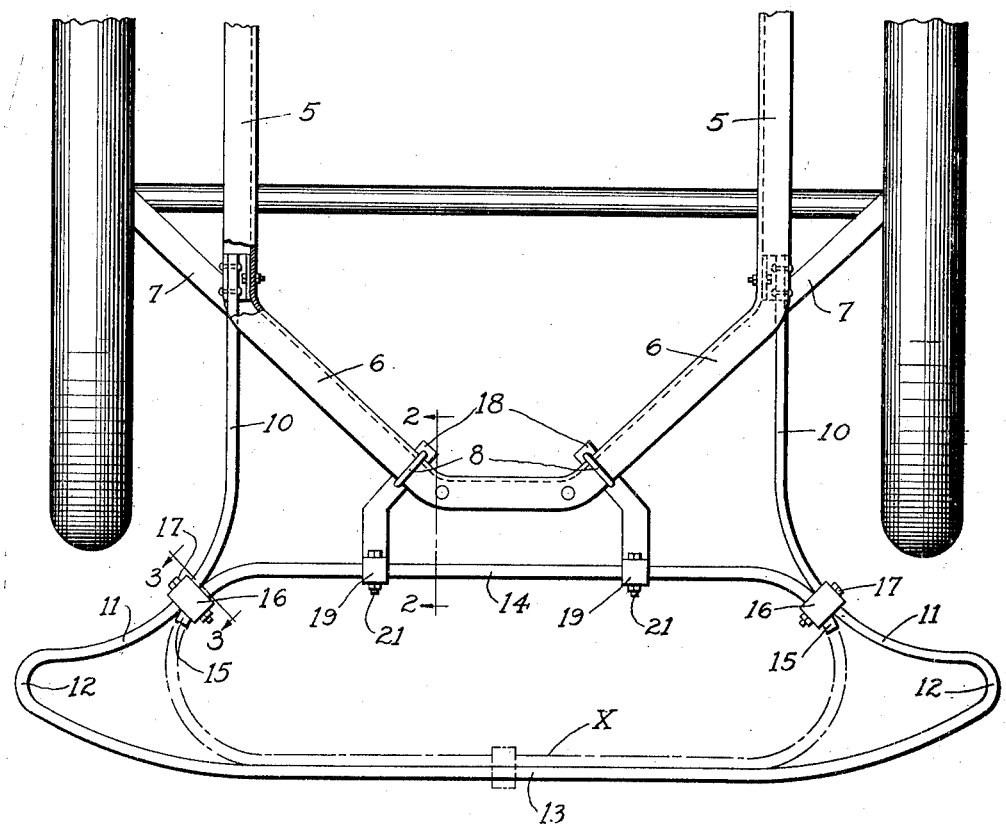
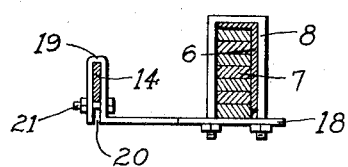
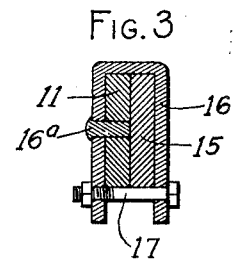
INVENTOR
LEWIS F. STAFFORD
By Benjamin, Roodhouse & Lundy. ATTYS.

UNITED STATES PATENT OFFICE.

LEWIS F. STAFFORD, OF CHICAGO, ILLINOIS.

BUMPER FOR VEHICLES.

1,348,329.  Specification of Letters Patent.  Patented Aug. 3, 1920.

Application filed October 27, 1919. Serial No. 333,434.

*To all whom it may concern:*

Be it known that I, LEWIS F. STAFFORD, a citizen of the United States, residing at Chicago, in the county of Cook and State of Illinois, have invented new and useful Improvements in Bumpers for Vehicles, of which the following is a specification.

My present invention has relation to bumpers or protectors for motor driven and other vehicles for use in protecting the front and rear portions thereof from being damaged by collisions. In devices of this character, it has heretofore been the practice to support the bumper by means of side-brackets that are attached directly to the frame of the chassis or to extended ends of the longitudinally disposed side spring of the vehicle. This structure unavoidably limits desirable resiliency by compelling the use of a heavier weight of metal to secure the necessary strength. With my hereinafter described construction the weight or gage of metal may be less than heretofore employed, and, nevertheless, the strength and resiliency of the structure much increased. Also, when the chassis frame terminates under the body and a distance back of the ends thereof, as in some of the recent types of motor vehicles, the side-brackets above-mentioned must be elongated in order to position the transverse portion of the bumper beyond the transverse plane of the front and rear ends of the mud-guards and wheels. This construction is subject to intense vibration at its outer end during driving over rough roads which is liable to loosen the bolts or other means by which the bumper is secured to the vehicle, thereby rendering the device useless for the purpose for which it is installed.

It is, therefore, an object of my invention to provide a bumper that is effectively supported at a third point or points, or a point intermediate the planes where the side-brackets are attached to the chassis frame in such a manner as to secure the additional support while retaining the necessary resiliency. And other objects of my invention are the provision of a bumper device for motor vehicles which is simple in construction and may be economically manufactured; which affords effective facilities for ready and quick attachment to the vehicles; and which is dependable in its operation. Further objects will be apparent to others after an understanding of my invention is had, and I prefer to accomplish these divers objects in substantially the manner and by the means hereinafter disclosed.

Reference will now be had to the accompanying drawings forming a portion of this specification, in which—

Figure 1 is a plan of my improved bumper for vehicles, showing the same installed upon the chassis of a motor vehicle, the contiguous portions of the vehicle body being removed for the purpose of simplicity.

Fig. 2 is a detail view of the clip employed in supporting and securing the intermediate portion of the bumper to the vehicle.

Fig. 3 is a transverse section on line 3—3, Fig. 1, looking in the direction of the arrows.

In the drawings similar reference characters have been employed to designate the same parts throughout the divers figures, and by referring to Fig. 1, it will be seen that the chassis comprises longitudinally disposed parallel side-sills 5, 5, the forward portions 6 whereof, at approximately the transverse plane of the radiator or slightly in front of the axle, are bent so as to converge toward each other and meet at the central longitudinal plane of the chassis frame, thereby providing a platform for the forward springs 7. These springs are secured to their respective platform sills 6 by means of clips or yokes 8 that embrace the superimposed leaves of the springs and clamp them to the usual bottom tie plate, and in assembling my bumper with the chassis, I prefer to substitute a specially constructed tie-plate, as hereinafter will more fully appear.

My improved bumper, preferably, comprises a length of strap metal of suitable gage and width that is bent so that its end portions provide longitudinal parallel arms 10, 10, spaced apart substantially the width of the frame of the chassis and are bolted, or otherwise suitably secured to the parallel portions of side-sills 5 thereof. Forward of arms 10, the metal piece is curved outwardly in long sweeps 11, 11, extending in opposite directions beyond the planes of the front wheels of the vehicle where the metal piece is given "hair-pin" bends 12, 12. The shock-receiving portion 13 of the metal piece between and connecting these "hair-pin" bends is substantially straight, and is given slight bends or sweeps where the same merges into the bends 12. Owing to the distance from this straight or shock-receiving portion 13 to the points of attachment at the extreme ends of the parallel arms 10 (particularly in the types of motor vehicles for which this structure is specially designed), it is desirable to support the structure at a third point or at a location intermediate the places of attachment to the side-sills of the chassis, and in this connection, I provide a bow-shaped piece, the central portion 14 whereof is substantially straight while the end portions 15 are curved outwardly so that their ends will rest flat against the sweeps 11 of the main portion of the bumper, as illustrated in Fig. 1 of the drawings.

Suitable yokes 16, 16, of substantially inverted U-shape are secured to ends 15 of the bow-shaped supporting piece by rivets 16$^a$ where they contact or engage sweeps 11, and said yokes extend down upon the opposite surface of sweeps 11 while the lower ends of the arms of the yoke are connnected by bolts 17 to prevent the accidental displacement of the two strap pieces, but permitting of a slight relative movement between the parts, as will be understood.

In order to connect the bow-shaped supporting pieces 14, 15, to the chassis of the vehicle, I have provided a device which is adapted to be substituted for the tie-plates that coöperate with clips 8 for holding the leaves of the springs, as hereinbefore mentioned. These devices, preferably, comprise plates 18, 18, that are flat, and substantially correspond with the usual tie-plates except that they are extended at their forward ends into inverted substantially U-shaped or hooked portions 19, 19, and deflected slightly toward each other so that the channels 20 or seats between the parallel members of the U will be in a position to receive and fit the adjacent portions of the bow-shaped supporting-piece 14. Bolts 21 connect the lower portions of the U after piece 14 has been positioned, and are adapted to clamp the latter firmly in position.

From the foregoing description taken in connection with the drawings, it will be seen that I have provided a bumper for vehicles that has a three-point mounting upon the chassis of the vehicle that obviates the necessity for providing additional braces directly upon the long arms 10 of the structure where the framework of the chassis terminates any considerable distance back of the transverse plane in which it is desirable or necessary to position the shock-receiving portion or member of the bumper structure. It will be obvious that the actual shape or design of the bumper or shock-receiving elements may be modified, as for example, the bowed supporting-piece 14—15 may be a complete ellipse continuous, as indicated by the broken lines $x$ in Fig. 1 of the drawings. I, therefore, desire it understood that all such changes are contemplated within the scope of the appended claims.

What I claim as new is:—

1. A bumper for motor vehicles comprising a horizontally disposed member arranged transversely of the vehicle, arms connecting said member to the longitudinal side-sills of the vehicle chassis, the outer portion of said arms curved outwardly away from each other, and a supplementary transverse and horizontal member secured to the vehicle chassis independently of the means for securing said arms and supporting the forward portion of said structure.

2. A bumper for motor vehicles, comprising a horizontally disposed member, the end portions whereof are bent inwardly and rearwardly to provide arms, means for securing the ends of said arms to the vehicle, a supplementary member connected to the before mentioned structure, and means for securing said supplementary member centrally of the vehicle.

3. A bumper for motor vehicles comprising a shock-receiving piece, arms extended therefrom and secured to the vehicle, a supplementary flexible member, means connecting the ends of said supplementary member to the beforementioned structure, and devices for connecting the supplementary member to the vehicle.

4. A bumper for motor vehicles comprising a horizontally disposed member, the end portions whereof are bent inwardly and rearwardly to provide arms, means for securing the ends of said arms to the vehicle, a supplementary member the ends whereof are connected to the beforementioned structure, and means for securing said supplementary member centrally of the vehicle.

5. A bumper for motor vehicles comprising a horizontally disposed member, the end portions whereof are bent inwardly and rearwardly to provide substantially parallel supporting arms, means for securing the ends of said arms to the vehicle, a supplementary member oppositely disposed with respect to said first-mentioned member, and the ends whereof are connected to the beforementioned structure, and means for securing the central portion of said supplementary member centrally of the vehicle.

6. The combination with the chassis-frame of a vehicle, and springs carried thereby, of a shock-receiving piece having members extended therefrom and secured to the chassis-frame, and means for supporting the last-mentioned structure intermediate the places where said members are secured to the vehicle; said means including the devices that secure said springs to said frame.

7. The combination with the chassis-frame of a vehicle, and springs carried thereby, of a shock-receiving piece having members extended therefrom and secured to the chassis-frame, a supplementary member connected to the last-mentioned structure, and means for securing said supplementary member to the chassis-frame and comprising the elements that secure said springs to said frame.

8. The combination with the chassis-frame of a vehicle, springs, and devices securing said springs to said frame, of a shock-receiving element having lateral members that are secured to said frame, and a supplementary member connected to the last mentioned structure and secured to the frame by said spring-securing devices.

9. The combination with a vehicle frame and springs, of a bumper comprising an outwardly bowed shock-receiving member, arms connecting said member to said vehicle frame, an oppositely bowed supplementary member slidably connected to said arms, and common devices for securing said springs and supplementary member to said frame.

10. The combination with a vehicle-frame and springs, of a bumper comprising an outwardly bowed shock-receiving member, arms connecting said member to said vehicle-frame, an oppositely bowed supplementary member slidably connected to said arms, clips connecting said springs to said frame, and hooks extended from said clips for supporting said supplementary member intermediate said arms.

11. In a bumper for motor vehicles, a shock receiving piece, members extended rearwardly therefrom and secured to the vehicle, in combination with a supplementary supporting structure suitably connected to the aforesaid structure and connected to the vehicle body at a point independent of the means for securing said first mentioned structure to the vehicle.

12. In a bumper for motor vehicles, a shock-receiving piece, members extended rearwardly therefrom and secured to the vehicle, in combination with a supplementary supporting structure consisting of a horizontally yieldable metal strap suitably connected to the aforesaid structure and connected to the vehicle body at a point independent of the means for securing said first mentioned structure to the vehicle.

13. In a bumper for motor vehicles, a shock-receiving piece, members extended rearwardly therefrom and secured to the vehicle, in combination with a supplementary integral supporting and shock-receiving structure connected at opposite locations to said first-mentioned shock-receiving piece and connected to the vehicle body at a point independent of the means for securing said first-mentioned structure to the vehicle.

14. A bumper for motor vehicles comprising a piece of strap-metal bent to provide a shock-receiving piece, arms extended rearwardly from said shock-receiving piece and secured to the vehicle, and a secondary piece of strap-metal connected to the first-mentioned piece and supporting the same, and connected directly to the vehicle independent of said arms.

15. A bumper for motor vehicles comprising a shock-receiving piece with arms extended rearwardly from the ends thereof for attachment to the vehicle, and a supplementary member extending and having attachment directly between the shock-receiving piece and a portion of the vehicle between and forward of the points of attachment of the before mentioned arms; said members consisting of strap-metal vertically disposed whereby a cantaliver support is provided for maintaining the bumper in position and against impacts received thereby.

Signed at Chicago, county of Cook, and State of Illinois, this 22nd day of October, 1919.

LEWIS F. STAFFORD.

Witnesses:
 FRANK P. ILLSLEY,
 E. K. LUNDY, Jr.